US007483787B2

(12) United States Patent
Dehn

(10) Patent No.: US 7,483,787 B2
(45) Date of Patent: Jan. 27, 2009

(54) DETERMINING INTERSECTIONS OF MULTI-SEGMENT THREE-DIMENSIONAL PATH WITH PORTIONS OF PARTITIONED THREE-DIMENSIONAL SPACE

(75) Inventor: Jonathan Dehn, Damascus, MD (US)

(73) Assignee: Lockheed Martin Corporation, Bethesda, MD (US)

( * ) Notice: Subject to any disclaimer, the term of this patent is extended or adjusted under 35 U.S.C. 154(b) by 560 days.

(21) Appl. No.: 11/331,525

(22) Filed: Jan. 12, 2006

(65) Prior Publication Data

US 2008/0319647 A1 Dec. 25, 2008

(51) Int. Cl.
*G09G 5/00* (2006.01)
*G06F 19/00* (2006.01)

(52) U.S. Cl. ......................... 701/202; 701/10; 701/300; 345/419

(58) Field of Classification Search ..................... 701/3, 701/10, 200, 202, 120; 382/117; 715/782; 345/427, 419, 653, 664, 6, 84; 348/740, 348/790, 792

See application file for complete search history.

(56) References Cited

U.S. PATENT DOCUMENTS 5,636,123 A 6/1997 Rich et al.
5,751,289 A * 5/1998 Myers ........................ 345/419
6,085,147 A 7/2000 Myers
6,314,362 B1 * 11/2001 Erzberger et al. ........... 701/120
2004/0153884 A1 8/2004 Fields et al.

OTHER PUBLICATIONS

International Search Report And The Written Opinion Of The International Searching Authority, Or The Declaration. International Application No. PCT/US 07/60331. Mailing Date Nov. 14, 2007.

* cited by examiner

*Primary Examiner*—Tan Q Nguyen
(74) *Attorney, Agent, or Firm*—Marsh Fischmann & Breyfogle LLP

(57) ABSTRACT

A computationally efficient method and system of finding intersections of a three-dimensional path (e.g., an airpath) through a three-dimensional space (e.g., an airspace) partitioned into multiple volumes. In one embodiment, such a method includes determining whether a current point of a current segment of the path is included within one of the volumes, establishing such volume as a current volume, determining whether a boundary of the current volume is intersected by the current segment, setting the intersection point as an exit point of the path, adjusting the current point of the current segment to the exit point, identifying a volume adjacent to the current volume that includes the exit point, changing the current volume to the adjacent volume, and setting the current point of the current segment as an entry point of the path.

25 Claims, 4 Drawing Sheets

DETERMINING INTERSECTIONS OF MULTI-SEGMENT THREE-DIMENSIONAL PATH WITH PORTIONS OF PARTITIONED THREE-DIMENSIONAL SPACE

GOVERNMENT INTERESTS

This invention was made with Government support under Contract No. DTA01-88-C-00042 awarded by the Department of Transportation. The Government has certain rights in this invention.

FIELD OF THE INVENTION

The present invention relates generally to modeling of air traffic, and more particularly to determining information relating to an airborne vehicle's trajectory through a three-dimensional space.

BACKGROUND OF THE INVENTION

To facilitate air traffic control operations, an airspace may be divided into a number of adjacent three-dimensional volumes comprising the space. The trajectory or path of an airborne vehicle (e.g., an airplane, helicopter, airship, balloon, missile, rocket, or the like) through a three-dimensional airspace may be divided into a number of consecutive segments represented by four-dimensional information (e.g., latitude, longitude, altitude and time) defining various points along the path. The intersections of the segments comprising the airborne vehicle's path with the boundaries of each volume are needed in order to determine when the airborne vehicle will enter particular volumes. By finding the latitude, longitude, and altitude of the intersection points, the time that the airborne vehicle enters each volume can be found (assuming information regarding the airborne vehicle's air speed is also available). The times that the airborne vehicle enters particular volumes comprising the airspace are relevant, for example, to controlling when information about the airborne vehicle is provided to air traffic controllers responsible for controlling particular volumes of the airspace.

Some techniques for determining the relevant intersections involve comparing each segment of the path with all of the volumes of the partitioned three-dimensional space. As may be appreciated, determining the intersection points in this manner can be a computation intensive process, particularly when multiple paths through the partitioned airspace are being simultaneously considered. For example, where the path includes N segments and the airspace includes M volumes, the compute time is on the order of N×M. Furthermore, even if a particular segment is found to intersect the boundary of a particular volume, the comparisons for such segment are not complete as it may intersect additional volume boundaries.

SUMMARY OF THE INVENTION

Accordingly, the present invention is directed to a computationally efficient manner of finding the intersections of a three-dimensional path such as, for example, an airpath through a three-dimensional space such as, for example, an airspace. In accordance with the present invention, information about each volume comprising the space includes not only the locations of various corners and/or dimensions defining the volume, but also information indicating which other volumes included in the partitioned space are adjacent to the volume. A method and system of finding the intersections proceed sequentially from segment to segment along the path searching only for intersections of a current segment with a current volume. Each time an intersection is found, the volume adjacent to the current volume that is being entered is established as the new current volume. This provides a compute time on the order of N (the number of segments in the path), thereby facilitating real-time implementation of the present invention.

According to one aspect of the present invention, a method of determining intersections of a multi-segment three-dimensional path with boundaries of one or more volumes comprising a partitioned three-dimensional space is provided. The method is intended for evaluating a continuous path although a discontinuous path may also be evaluated in accordance with the method by treating the discontinuous path as several invocations of a continuous path. The path may, for example, represent the flight path of an airborne vehicle through an airspace comprised by the partitioned three-dimensional space.

The method includes determining whether a current point of a current segment of the path is included within one of the volumes. In this regard, the method may, for example, be initiated with a first segment of the path as the current segment and an initial point of the first segment as the current point.

When the current point of the current segment is determined to be within a volume a number of steps are executed. The volume including the current point of the current segment is established as the current volume, and a determination is made as to whether the current segment intersects a boundary of the current volume at a location on the current segment between the current point and an end point of the current segment. In this regard, evaluation of whether the current segment intersects a boundary of the current volume may include determining whether the current segment intersects a side boundary of the current volume, and when it is determined that the current segment does not intersect a side boundary of the current volume, comparing the altitude of the end point of the current segment with altitudes of top and bottom boundaries of the current volume.

When it is determined that the current segment intersects a boundary of the current volume, a number of steps are executed. The location of the current segment where the current segment intersects a boundary of the current volume is set as an exit point of the path from the current volume. The current point of the current segment is adjusted to the exit point of the path from the current volume. A volume adjacent to the boundary of the current volume including the exit point is identified. If there is no volume adjacent to the boundary of the current volume including the exit point, then the path exits the partitioned space. The location of the current segment where the current segment intersects a boundary of the adjacent volume is set as an entry point of the path into the adjacent volume, and the current volume is changed to the adjacent volume. Thereafter, a determination is made again as to whether the current segment intersects a boundary of the current volume.

When it is determined that the current segment does not intersect a boundary of the current volume, the method includes changing the current segment to the next segment in the path, setting an initial point of the next segment as the current point, and thereafter returning to the step of determining whether the current segment intersects a boundary of the current volume. If there is no next segment, then the path is complete.

When it is determined that no portion of the current segment is within one of the volumes, the method includes a number of different steps. A determination is made as to whether the current segment enters one of the volumes, and when the current segment is determined to enter a volume, the volume entered by the current segment is set as the current volume, a location on the current segment coincident with an entry point of the current volume is set as the current point of the current segment, and the method returns to the step of determining whether the current segment intersects a boundary of the current volume. When the current segment is determined to not enter a volume, the current segment is changed to the next segment in the path, an initial point of the next segment is set as the current point, and the method returns to the step of determining whether the current point of the current segment of the path is included within one of the volumes.

In order to find all of the intersections of the various segments comprising the path with the boundaries of the partitioned three-dimensional space, the foregoing steps of the method may be repeated until all segments of the path are evaluated. As the various intersections (entry/exit points) are identified, or after all of the intersections are identified, the entry and exits points associated with volumes of the space may be stored (e.g., on a data storage device) for subsequent retrieval and transmission to an apparatus requesting such information (e.g., an air traffic control system). The entry/exit points may also be transmitted in real time as they are identified to an apparatus (e.g., an air traffic control system) requesting such information.

According to another aspect of the present invention, a system operable to determine the intersections of a multi-segment three-dimensional path with one or more volumes comprising a partitioned three-dimensional space is provided. The system is intended for evaluating a continuous path although the system may also be used to evaluate a discontinuous path by treating the discontinuous path as several invocations of a continuous path. The path may, for example, represent the flight path of an airborne vehicle through an airspace.

The system includes a processor and information defining the path and the volumes. In this regard, the information may be stored on a data storage device accessible to the processor. For example, the processor and the data storage device may be included in one computer system or in more than one computer systems connectable with one another via a local area and/or a wide area network.

In addition to being enabled to access the information, the processor is operable to determine whether a current point of a current segment of the path is included within a volume of the of the space. In this regard, the processor may initially start with the first segment of the path as the current segment and an initial point of the first segment as the current point.

When the current point of the current segment is within a volume of the space, the processor is also operable to accomplish a number of other tasks. In this regard, the processor is operable to establish the volume of the space including the current point of the current segment as a current volume, and to determine whether the current segment intersects a boundary of the current volume at a location on the current segment between the current point and an end point of the current segment. In this regard, the processor may determine whether the current segment intersects a boundary of the current volume by determining whether the current segment intersects a side boundary of the current volume, and, when the processor determines that the current segment does not intersect a side boundary of the current volume, the processor may compare the altitude of the end point of the current segment with altitudes of top and bottom boundaries of the current volume to determine if the current segment intersects either the top or bottom boundaries.

When the current segment intersects a boundary of the current volume, the processor is also operable to accomplish a number of additional operations. In this regard, the processor is enabled to set the location of the current segment where the current segment intersects a boundary of the current volume as an exit point of the path from the current volume, identify a volume adjacent to the boundary of the current volume including the exit point of the path from the current volume, adjust the current point of the current segment to the exit point of the path from the current volume, set the location of the current segment where the current segment intersects a boundary of the adjacent volume as an entry point of the adjacent volume, and change the current volume to the adjacent volume.

When the current segment does not intersect a boundary of the current volume, the processor is further operable to change the current segment to the next segment in the path and set an initial point of the next segment as the current point. When the current point of the current segment is not within a volume of the space, the processor is further operable to determine whether the current segment enters one of the volumes, and, when the current segment enters a volume, set the volume entered by the current segment as the current volume and set a location on the current segment coincident with an entry point of the path into the current volume as the current point of the current segment, and, when the current segment does not enter a volume, change the current segment to the next segment in the path and set an initial point of the next segment as the current point.

In order to find all of the intersections of the various segments comprising the path with the boundaries of the partitioned three-dimensional space, the processor may be operable to repeat the foregoing activities as appropriate until all of the segments of the path have been processed. Thereafter, the processor may store the exit and entry points of the path on the data storage device and/or transmit them in real time to another system such as, for example, an air traffic control system.

These and other aspects and advantages of the present invention will be apparent upon review of the following Detailed Description when taken in conjunction with the accompanying figures.

DESCRIPTION OF THE DRAWINGS

For a more complete understanding of the present invention and further advantages thereof, reference is now made to the following Detailed Description, taken in conjunction with the drawings, in which.

DETAILED DESCRIPTION

Figure 1:
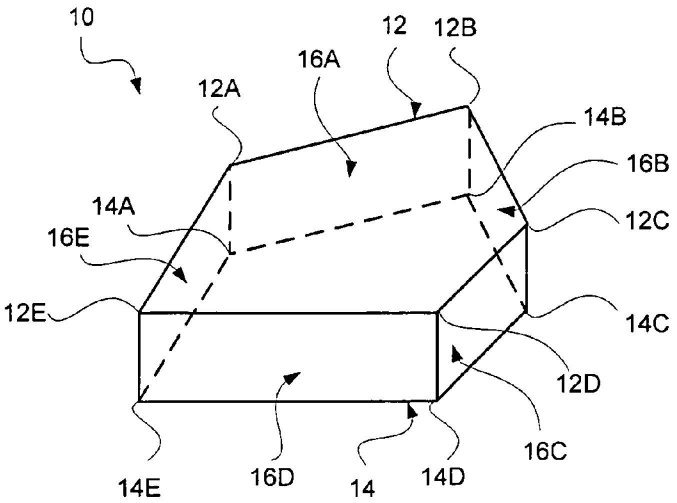
FIG. 1 illustrates an exemplary volume that may be included in a partitioned three-dimensional space.
Figure 3A:
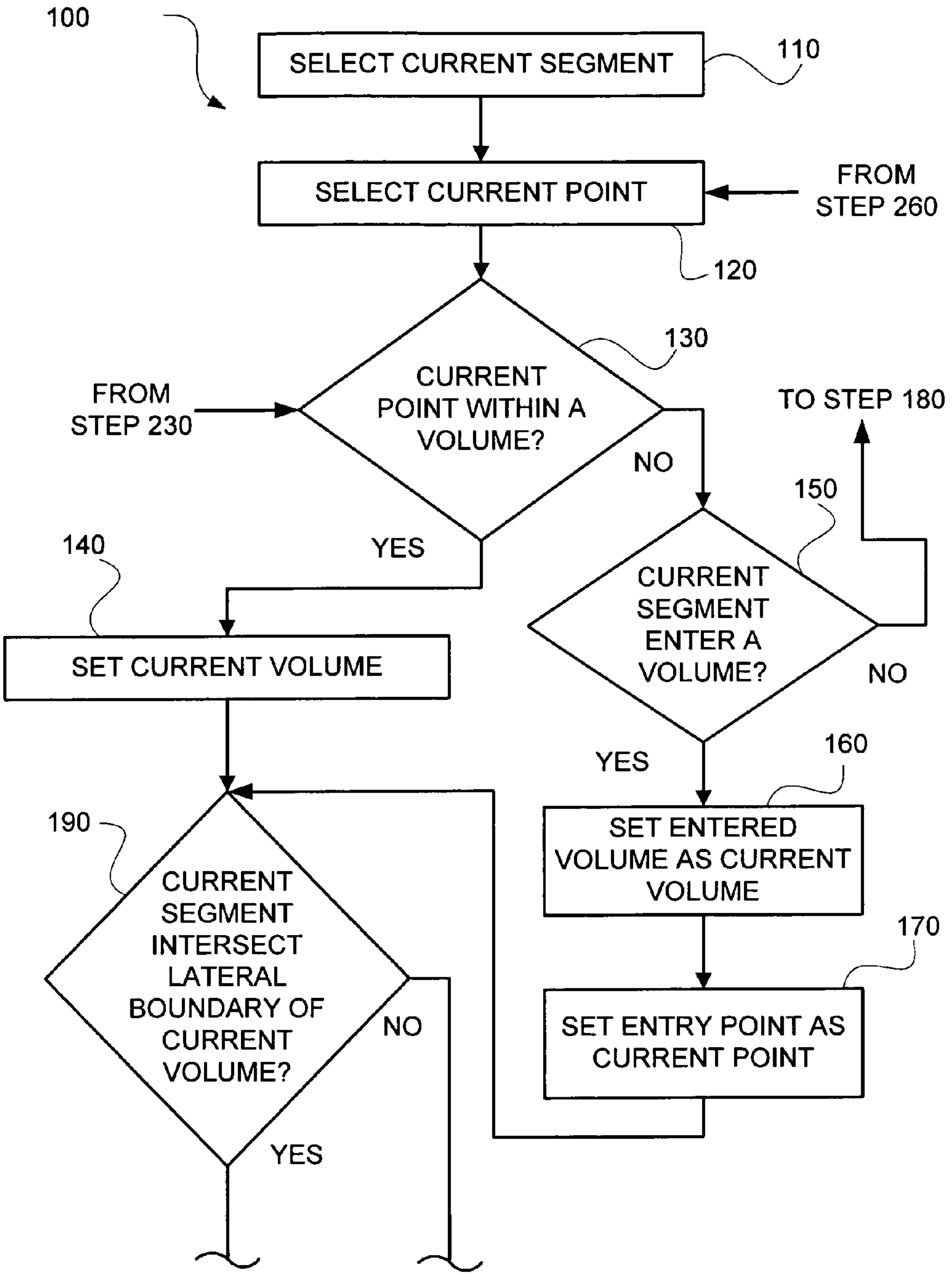
FIGS. 3A-3B shows the steps of one embodiment of a method of determining the intersections of a multi-segment three-dimensional path with the boundaries of volumes comprising a partitioned three-dimensional space in accordance with the present invention.
Figure 3B:
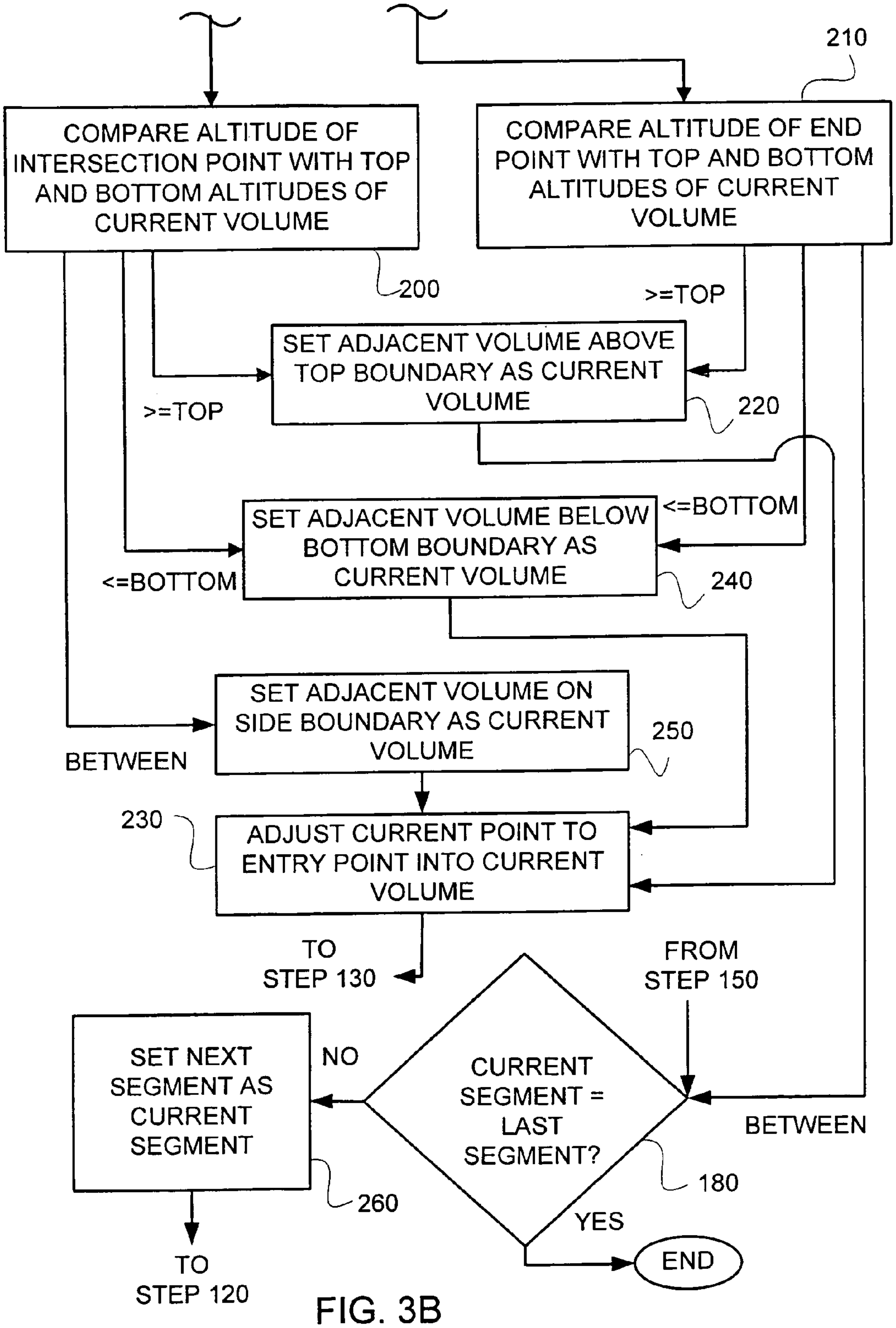

FIG. 1 shows an exemplary volume 10 which may be included in a partitioned three-dimensional space, such as an airspace. The volume includes a horizontal polygonal top surface 12, a horizontal polygonal bottom surface 14, and a plurality of vertical rectangular side surfaces 16A-16E. The top and bottom surfaces 12, 14 are identically shaped and sized and are defined by the geodetic coordinates (latitude, longitude, and altitude) of their respective corners 12A-12E, 14A-14E. The altitude of each top corner 12A-12E is the same, and the altitude of each bottom corner 14A-14E is the same and is lower than the altitude of the top corners 12A-12E. Although the volume 10 is depicted having five respective top and bottom corners 12A-12E, 14A-14E and five side surfaces 16A-16E, the volume 10 may have fewer than five top corners, bottom corners, and sides, or more than five top corners, bottom corners, and sides. Although the embodiment of the intersection determination method described herein in connection with FIGS. 3A-3B is intended for volumes having parallel horizontal top and bottom surfaces such as depicted in FIG. 1, it is possible to utilize other embodiments of the method with volumes wherein one or both of the top and bottom surfaces 12, 14 are non-horizontal and/or non-parallel. It also possible for the top and bottom surfaces 12, 14 to be differently sized and/or shaped. Additionally, the side surfaces 16A-16E can be non-vertical, and the side surfaces 16A-16E may also be non-rectangular.

Figure 2:
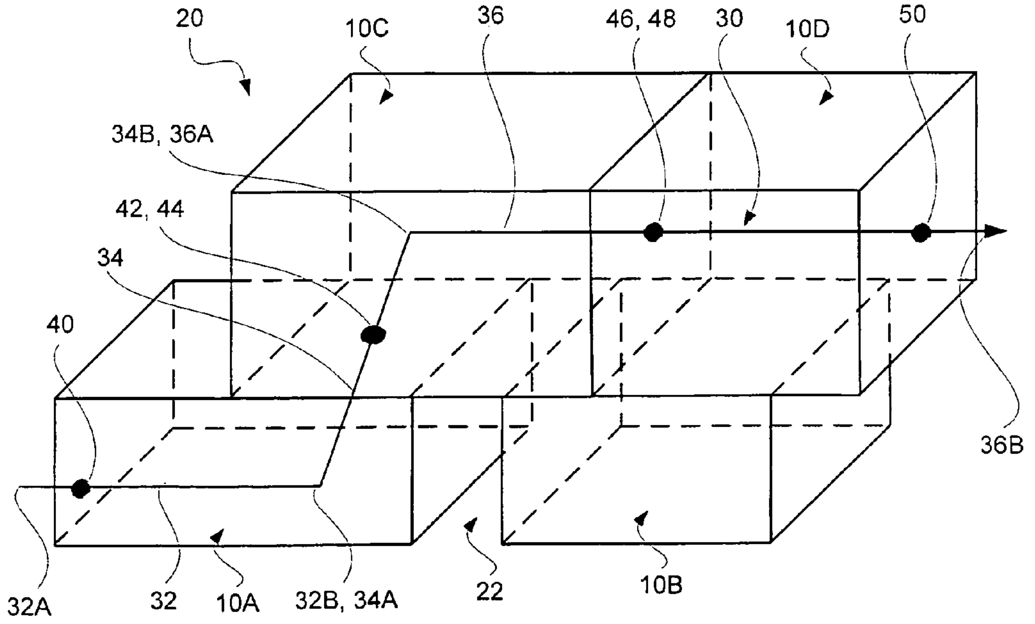
FIG. 2 illustrates an exemplary multi-segment path within an exemplary partitioned three-dimensional space.

FIG. 2 shows an exemplary partitioned three-dimensional airspace 20. The airspace 20 is partitioned into four volumes 10A-10D. Each volume 10A-10D has horizontal rectangular shaped top and bottom surfaces and four vertical rectangular shaped side surfaces. As shown, the bottom surface of one of the volumes 10C is adjacent to and contacts portions of the top surfaces of two of the volumes 10A-10B. Volume 10D is adjacent to and shares a side surface with volume 10C, and the bottom surface of volume 10D is adjacent to and contacts a portion of the top surface of volume 10B. As illustrated, there may be a gap between adjacent volumes such as, for example the gap 22 between volumes 10A and 10B.

FIG. 2 also shows an exemplary three-dimensional path 30, such as an airpath, through the partitioned airspace 20. The airpath 30 includes first, second and third segments 32, 34, 36. The first segment 32 includes an initial point 32A outside of the partitioned airspace 20, enters volume 10A at entry point 40 on a side of volume 10A, and ends at endpoint 32B thereof within volume 10A. The second segment 34 includes an initial point 34A inside volume 10A and coincident with the end point 32B of the first segment 32. The second segment 34 exits volume 10A at exit point 42 on the top surface of volume 10A. The second segment 34 enters volume 10C at entry point 44 on the bottom surface of volume 10C. Entry point 44 is coincident with exit point 42 since there is no gap between volumes 10A and 10C. The second segment 34 ends within volume 10C at endpoint 34B thereof. The third segment 36 includes an initial point 36A inside volume 10C and coincident with the end point 34B of the second segment 34. The third segment 36 exits volume 10C at exit point 46 on a side surface of volume 10C. The third segment 36 enters volume 10D at entry point 48 on a side surface of volume 10D. Entry point 48 is coincident with exit point 46 since there is no gap between volumes 10C and 10D. The third segment traverses volume 10D, exits volume 10D at exit point 50 on a side surface of volume 10D, and ends at endpoint 36B outside of the partitioned airspace 20.

FIGS. 3A-3B illustrates the steps involved in one embodiment of a method (100) of determining the intersections of a multi-segment three-dimensional path such as, for example, airpath 30 depicted in FIG. 2, with the boundaries of a number of volumes comprising a partitioned three-dimensional space. The method (100) outputs a list of "entry" and "exit" points wherein the path enters or exits a specific volume of the space. Where adjacent volumes share a common boundary, an "exit" point from one of the adjacent volumes may coincide with an "entry" point of the other adjacent volume. However, there may be a gap between adjacent volumes where the path exits one of the volumes, in which case the exit and entry points will not be coincident.

The method (100) begins with selecting (110) a segment of the path to be examined. Such segment is referred to herein as the current segment. Initially, the first segment of the path is selected as the current segment, although in other embodiments it may be possible to initially select a different segment of the path as the current segment. After selecting the current segment, a point on the current segment is selected (120) as the current point to be examined. Initially, the first point on the current segment is set as the current point, although in other embodiments it may be possible to initially select a different point of the current segment as the current point.

After establishing the current segment and current point, the current point is compared (130) with one or more of the volumes in order to determine which, if any, of the volumes includes the current point. The first volume that is found to include the current point is set (140) as the current volume, and if none of the volumes includes the current point of the current segment, the current volume is set to null.

When it is determined in step (130) that the current point of the current segment is not within any of the volumes (i.e., the current volume is null), the current segment is checked (150) to see if it enters any of the volumes. If a volume is entered by the current segment, such entered volume is set as the current volume (160) and the point on the current segment coinciding with the entry point of the current volume is set (170) as the current point. In step (170), the entry point into the current volume may be output (e.g., to a storage device and/or to an air traffic control system). When checking step (150) results in a determination that the current segment does not enter any of the volumes, then the method (100) proceeds to step (180).

When, it is determined in step (130) that the current point of the current segment is within one of the volumes, the current segment is then checked (190) for an intersection with a lateral boundary of the current volume. In this regard, respective lateral boundaries of the current volume may be defined by planes extending above and below the top and bottom boundaries of the current volume that include respective sides of the current volume. If the current segment does intersect a lateral boundary of the current volume, then the altitude at the point of intersection is compared (200) against the top and bottom altitudes of the current volume to determine whether the current segment exits from the top, bottom or a side of the current volume. If the intersection altitude is at or above the top altitude of the current volume, then the current segment exits the top of the current volume and the method (100) proceeds to step (220). If the intersection altitude is at or below the bottom altitude of the current volume, then the current segment exits the bottom of the current volume and the method (100) proceeds to step (240). If the altitude of the intersection point is between the top and bottom altitudes, then the current segment exits out a side of the current volume and the method proceeds to step (250).

If it is determined in step (190) that the current segment does not intersect a lateral boundary of the current volume, the altitude of the end of the current segment is compared (210) against the top and bottom altitudes of the current volume to confirm that the end point of current segment is within the current volume. If the altitude of the end point of the current segment is below the bottom altitude of the current volume, then the current segment presumably exits the bottom of the current volume and the method (100) proceeds to step (240). If the altitude of the end point of the current segment is above the top altitude of the current volume, then the current segment presumably exits the top of the current volume and the method proceeds to step (220). If the end point altitude is within the altitude range of the current volume, then the current segment does not exit the current volume and the method (100) proceeds to step (180).

In the cases where the current segment exits the current volume whether by the side, top or bottom, the method (100) makes use of adjacent volume information derived from the description of each volume in the three-dimensional space to efficiently determine which volume, if any, the current segment is entering. In this regard, the description of the current volume includes a list of adjacent volumes on both the bottom and the top. The point of exit from the current volume (e.g., the intersection of the current segment with the bottom or top of the current volume) is checked against the boundaries of the volumes in the list of volumes adjacent to the current volume. Where the current segment exits the top of the current volume, the adjacent volume above the current volume that includes the point of exit is set (220) to be the current volume, and the current point of the current segment is adjusted (230) to start at the point of exit. Where the current segment exits the bottom of the current volume, the adjacent volume below the current volume that includes the point of exit is set (240) to be the current volume, and the current point of the current segment is adjusted (230) to start at the point of exit.

The description of the current volume also includes a list of adjacent volumes for each side in the current volume. In the case where the current segment exits out the side of the current volume, the point of exit (e.g., the intersection of the current segment with the boundary of the current volume) is checked against all volumes in the adjacent volume list for the particular side that the current segment exits. The adjacent volume on the side of the current volume that includes the point of exit is set (250) as the current volume, and the current point of the current segment is adjusted (230) to start at the point of exit. In step (230), the exit point of the current segment from the previous current volume and the entry point of the current segment into the new current volume may be output (e.g., to a storage device and/or to an air traffic control system).

If it is determined in steps (190 and 210) that the current segment does not exit the top, the bottom or a side of the current volume, or if it is determined is step (150) that the current segment does not enter one of the volumes, then a check (180) is made regarding whether the end of the path has been reached (e.g., is the current segment the last segment of the path within the partitioned three-dimensional space). If this is the case, then the search is complete and the method (100) concludes. If another segment is available, then the current segment is set (260) to the next full segment in the path. Thereafter, the method (100) proceeds to step (120) and starts the process again.

Figure 4:
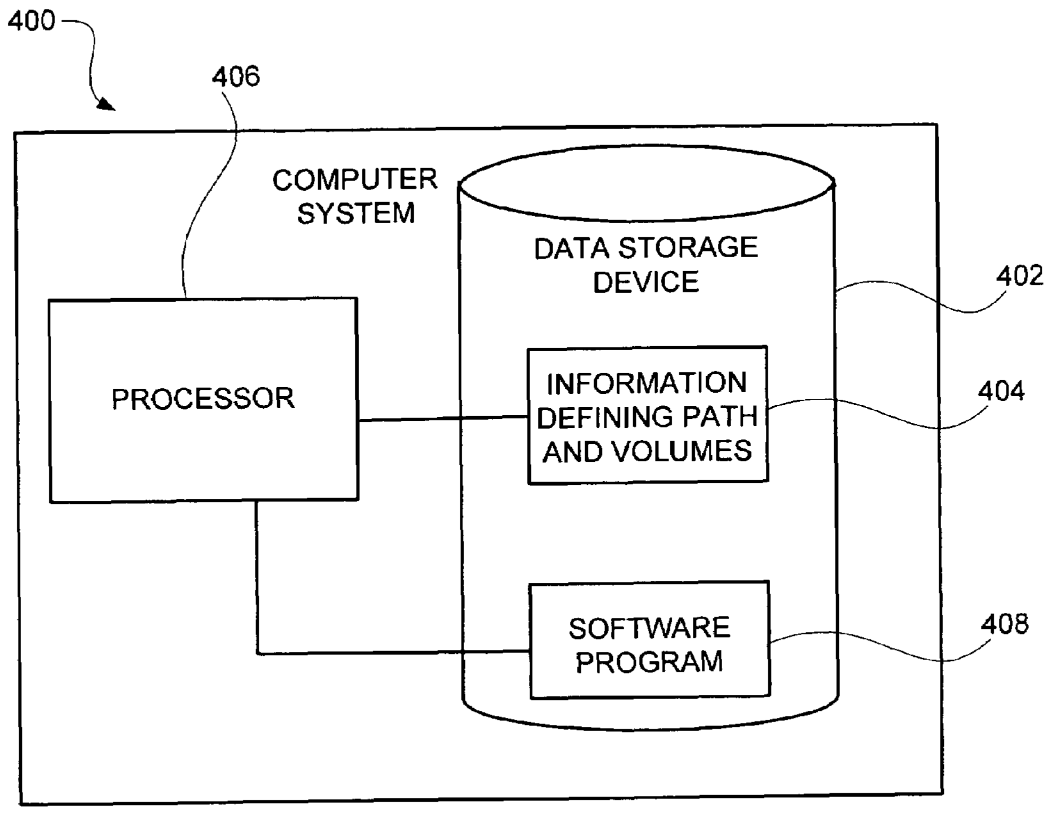
FIG. 4 is a block diagram showing one embodiment of system operable to determine the intersections of a multi-segment three-dimensional path with the boundaries of volumes comprising a partitioned three-dimensional space in accordance with the present invention.

Referring now to FIG. 4 there is shown one embodiment of a system 400 operable to determine the intersections of a multi-segment three-dimensional path such as, for example, airpath 30 depicted in FIG. 2, with the boundaries of various volumes comprising a partitioned three-dimensional airspace, such as shown in FIG. 2. The system includes a data storage device 402 having information 404 stored thereon that defines the path and the volumes. The information 404 may, for example, comprise geodetic coordinates of the various corners of the volumes and geodetic coordinates of the initial points and the end points of the various segments of the path.

The system 400 also includes a processor 406 enabled for accessing the information 404 on the on the data storage device 402. As may be appreciated, system 400 may comprise components of a computer system or the like. The processor 406 is enabled for implementing a method of determining the intersections of the multi-segment three-dimensional airpath with the boundaries of the various volumes comprising the partitioned three-dimensional airspace. In this regard, a method (100) such as shown in FIGS. 3A-3B may be implemented as a software program 408, the instructions of which are stored on the data storage device 402 and are executable by the processor 406.

While various embodiments of the present invention have been described in detail, further modifications and adaptations of the invention may occur to those skilled in the art. However, it is to be expressly understood that such modifications and adaptations are within the spirit and scope of the present invention.

What is claimed is:

1. A method of determining intersections of a multi-segment three-dimensional path with boundaries of one or more volumes comprising a partitioned three-dimensional space, said method comprising:

determining whether a current point of a current segment of the path is included within one of the volumes;

when the current point of the current segment is determined to be within a volume:

establishing the volume including the current point of the current segment as a current volume; and determining whether the current segment intersects a boundary of the current volume at a location on the current segment between the current point and an end point of the current segment;

when the current segment is determined to intersect a boundary of the current volume:

setting the location of the current segment where the current segment intersects a boundary of the current volume as an exit point of the path from the current volume;

adjusting the current point of the current segment to the exit point of the path from the current volume;

identifying a volume adjacent to the boundary of the current volume including the exit point of the path from the current volume;

setting the location of the current segment where the current segment intersects a boundary of the adjacent volume as an entry point of the path into the adjacent volume;

changing the current volume to the adjacent volume; and returning to said step of determining whether the current segment intersects a boundary of the current volume.

2. The method of claim 1 further comprising:

when the current segment does not intersect a boundary of the current volume:

changing the current segment to the next segment in the path;

setting an initial point of the next segment as the current point; and returning to said step of determining whether the current segment intersects a boundary of the current volume.

3. The method of claim 1 further comprising:

when the current point of the current segment is determined to not be within a volume:

determining whether the current segment enters one of the volumes;

when the current segment is determined to enter a volume:

setting the volume entered by the current segment as the current volume;

setting a location on the current segment coincident with an entry point of the current volume as the current point of the current segment; and returning to said step of determining whether the current segment intersects a boundary of the current volume; and when the current segment is determined to not enter a volume:

changing the current segment to the next segment in the path;

setting an initial point of the next segment as the current point; and returning to said step of determining whether the current point of the current segment of the path is included within one of the volumes.

4. The method of claim 1 wherein the path is continuous.

5. The method of claim 4 wherein the path represents the flight path of an airborne vehicle through an air space.

6. The method of claim 1 further comprising:

starting the method with a first segment of the path as the current segment and an initial point of the first segment as the current point.

7. The method of claim 1 further comprising:

outputting the entry and exit points of the path.

8. The method of claim 1 wherein the current volume includes a top boundary, a bottom boundary, and at least one side boundary contacting the top and bottom boundaries, and wherein said step of determining whether the current segment intersects a boundary of the current volume comprises:

determining whether the current segment intersects a side boundary of the current volume; and comparing the altitude of the end point of the current segment with altitudes of the top and bottom boundaries when it is determined that the current segment does not intersect a side boundary of the current volume.

9. A system operable to determine intersections of a multi-segment three-dimensional path with one or more volumes comprising a partitioned three-dimensional space, said system comprising:

information defining the path and the volumes;

a processor enabled for accessing the information, said processor being operable to determine whether a current point of a current segment of the path is included within a volume of the of the space, the processor being further operable when the current point of the current segment is within a volume of the space to:

establish the volume of the space including the current point of the current segment as a current volume;

determine whether the current segment intersects a boundary of the current volume at a location on the current segment between the current point and an end point of the current segment, and when the current segment intersects a boundary of the current volume:

set the location of the current segment where the current segment intersects a boundary of the current volume as an exit point of the path from the current volume;

adjust the current point of the current segment to the exit point of the path from the current volume;

identify a volume adjacent to the boundary of the current volume including the exit point of the path from the current volume;

set the location of the current segment where the current segment intersects a boundary of the adjacent volume as an entry point of the path into the adjacent volume; and change the current volume to the adjacent volume.

10. The system of claim 9 wherein said processor is further operable to change the current segment to the next segment in the path and set an initial point of the next segment as the current point when the current segment does not intersect a boundary of the current volume.

11. The system of claim 9 wherein said processor is further operable to:

determine whether the current segment enters one of the volumes when the current point of the current segment is not within a volume;

set the volume entered by the current segment as the current volume and set a location on the current segment coincident with an entry point of the path into the current volume as the current point of the current segment when the current segment enters a volume; and change the current segment to the next segment in the path and set an initial point of the next segment as the current point when the current segment does not enter a volume.

12. The system of claim 9 wherein the path is continuous.

13. The system of claim 12 wherein the path represents the flight path of an airborne vehicle through an air space.

14. The system of claim 9 wherein the processor starts with the first segment of the path as the current segment and an initial point of the first segment as the current point.

15. The system of claim 9 further comprising:

a storage device accessible by the processor, said storage device having the information stored thereon.

16. The system of claim 9 wherein the current volume includes a top boundary, a bottom boundary, and at least three side boundaries contacting the top and bottom boundaries, and wherein said processor is operable to:

determine whether the current segment intersects a side boundary of the current volume; and compare the altitude of the end point of the current segment with altitudes of the top and bottom boundaries when it is determined that the current segment does not intersect a side boundary of the current volume.

17. A system for determining intersections of a multi-segment three-dimensional path with boundaries of one or more volumes comprising a partitioned three-dimensional space, said system comprising:

means for determining whether a current point of a current segment of the path is included within one of the volumes;

means for establishing the volume including the current point of the current segment as a current volume when the current point of the current segment is within a volume;

means for determining whether the current segment intersects a boundary of the current volume at a location on the current segment between the current point and an end point of the current segment;

means for setting the location of the current segment where the current segment intersects a boundary of the current volume as an exit point of the path from the current volume when the current segment intersects a boundary of the current volume;

means for adjusting the current point of the current segment to the exit point of the current volume;

means for identifying a volume adjacent to the boundary of the current volume including the exit point of the path from the current volume;

means for setting the location of the current segment where the current segment intersects a boundary of the adjacent volume as an entry point of the path into the adjacent volume; and means for changing the current volume to the adjacent volume.

18. The system of claim 17 further comprising:

means for changing the current segment to the next segment in the path when the current segment does not intersect a boundary of the current volume; and means for setting an initial point of the next segment as the current point.

19. The system of claim 17 further comprising:

means for determining whether the current segment enters one of volumes when the current point of the current segment is not within a volume;

means for setting the volume entered by the current segment as the current volume when the current segment enters a volume;

means for setting a location on the current segment coincident with an entry point of the current volume as the current point of the current segment;

means for changing the current segment to the next segment in the path when the current segment does not enter a volume; and means for setting an initial point of the next segment as the current point.

20. The system of claim 17 wherein said means for determining whether a current point of a current segment of the path is included within one of the volumes, means for establishing the volume including the current point of the current segment as a current volume, means for determining whether the current segment intersects a boundary of the current volume at a location on the current segment between the current point and an end point of the current segment, means for setting the location of the current segment where the current segment intersects a boundary of the current volume as an exit point of the path from the current volume, means for adjusting the current point of the current segment to the exit point of the current volume, means for identifying a volume adjacent to the boundary of the current volume including the exit point of the path from the current volume, means for setting the location of the current segment where the current segment intersects a boundary of the adjacent volume as an entry point of the path into the adjacent volume, and means for changing the current volume to the adjacent volume comprise a processor and a software program executable by said processor.

21. The system of claim 20 further comprising means accessible to said processor for storing information defining the path and the volumes.

22. The system of claim 21 wherein said information defines the flight path of an airborne vehicle through an airspace.

23. The system of claim 21 wherein said means for storing comprise a data storage device.

24. The system of claim 23 wherein said processor and said data storage device are included within a single computer system.

25. The system of claim 23 wherein said processor and said data storage device are included within separate computer systems connectable via a network.

* * * * *

UNITED STATES PATENT AND TRADEMARK OFFICE
CERTIFICATE OF CORRECTION

PATENT NO. : 7,483,787 B2
APPLICATION NO. : 11/331525
DATED : January 27, 2009
INVENTOR(S) : Dehn It is certified that error appears in the above-identified patent and that said Letters Patent is hereby corrected as shown below:

Column 9, line 54, delete the second occurrence of "of the".

Signed and Sealed this

Nineteenth Day of May, 2009

JOHN DOLL
*Acting Director of the United States Patent and Trademark Office*